US009764899B2

(12) United States Patent
Van Den Berk

(10) Patent No.: US 9,764,899 B2
(45) Date of Patent: Sep. 19, 2017

(54) SYSTEM FOR STORING PRODUCT CONTAINERS AND METHOD FOR USING SUCH A SYSTEM

(71) Applicant: VANDERLANDE INDUSTRIES B.V., Veghel (NL)

(72) Inventor: Franciscus Maria Van Den Berk, Son en Breugel (NL)

(73) Assignee: VANDERLANDE INDUSTRIES B.V., Veghel (NL)

(*) Notice: Subject to any disclaimer, the term of this patent is extended or adjusted under 35 U.S.C. 154(b) by 0 days.

(21) Appl. No.: 14/899,484

(22) PCT Filed: Jun. 12, 2014

(86) PCT No.: PCT/NL2014/050381
§ 371 (c)(1),
(2) Date: Dec. 17, 2015

(87) PCT Pub. No.: WO2014/204300
PCT Pub. Date: Dec. 24, 2014

(65) Prior Publication Data
US 2016/0145043 A1 May 26, 2016

(30) Foreign Application Priority Data
Jun. 21, 2013 (NL) .................................. 2011021

(51) Int. Cl.
*G06F 7/00* (2006.01)
*B65G 1/04* (2006.01)
(Continued)

(52) U.S. Cl.
CPC ........... *B65G 1/0492* (2013.01); *G05B 15/02* (2013.01); *G05D 1/0234* (2013.01)

(58) Field of Classification Search
None
See application file for complete search history.

(56) References Cited

U.S. PATENT DOCUMENTS 7,128,521 B2 * 10/2006 Hansl .................. B66F 9/07
414/807
2005/0047895 A1 3/2005 Lert
(Continued)

FOREIGN PATENT DOCUMENTS

| FR | 2710330 | 3/1995 |
| WO | WO 2005/077789 | 8/2005 |
| WO | WO 2011/113053 | 9/2011 |

OTHER PUBLICATIONS

Search Report issued in Int'l App. No. PCT/NL2014/050381 (2014).

*Primary Examiner* — Yolanda Cumbess
(74) *Attorney, Agent, or Firm* — Barnes & Thornburg LLP; Mark J. Nahnsen

(57) ABSTRACT

The invention provides a system for storing product containers. The control system of the system comprises a central control unit to determine a route for a carriage along a part of a guide system and to send a control signal for the route in question to the carriage control unit of the carriage. The guide system is provided with unique identification signs at at least some of the junctions. Each carriage is provided with a reader for reading an identification sign and communicating said identification sign to the carriage control unit. The central control unit is designed to mark certain junctions as "blocked" under certain circumstances and to generate a list of unique identification signs associated with the "blocked" junctions. Each carriage control unit is designed to store said list in a database of the carriage control unit and to cause the carriage to stop if the identification sign is on the list as stored in the database of the carriage control unit.

15 Claims, 3 Drawing Sheets

Figure 1:
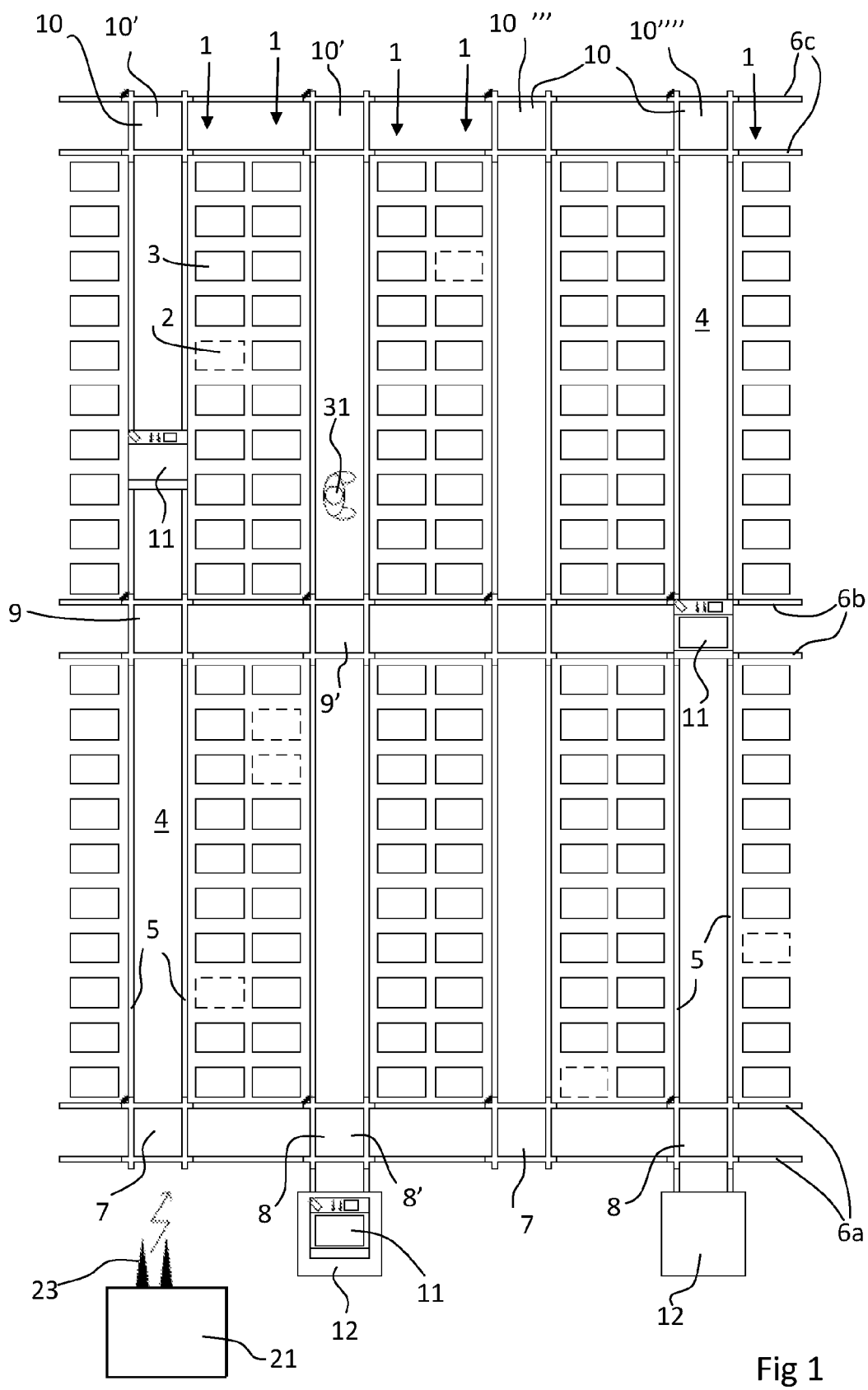

(51) Int. Cl.
*G05D 1/02* (2006.01)
*G05B 15/02* (2006.01)

(56) References Cited

U.S. PATENT DOCUMENTS

| | | | | |
|---|---|---|---|---|
| 2012/0004767 A1* | 1/2012 | Tominaga | ......... | H01L 21/67769 700/230 |
| 2012/0101627 A1* | 4/2012 | Lert | ..................... | B65G 1/1378 700/216 |
| 2012/0189410 A1* | 7/2012 | Toebes | ................. | B65G 1/0492 414/273 |
| 2012/0259482 A1 | 10/2012 | Jeschke | | |

* cited by examiner

SYSTEM FOR STORING PRODUCT CONTAINERS AND METHOD FOR USING SUCH A SYSTEM

CROSS REFERENCE TO RELATED APPLICATIONS

This application is a U.S. nationalization under 35 U.S.C. §371 of International Application No. PCT/NL2014/050381, filed Jun. 12, 2014, which claims priority to Netherlands Patent Application No. 2011021, filed Jun. 21, 2013. The disclosures set forth in the referenced applications are incorporated herein by reference in their entireties.

The present invention relates to a system for storing product containers, comprising a number of racks extending parallel to each other, wherein each rack is provided, on a first number of superposed levels, with side-by-side storage positions for product containers, a guide system comprising horizontal longitudinal guides extending in aisles between adjacent racks, parallel to the racks, on a second number of levels, horizontal transverse guides extending transversely to the longitudinal guides on the second number of levels, as well as junctions at positions where at least one longitudinal guide and at least one transverse guide connect, the system further comprising carriages capable of travelling along the guide system, the carriages each comprising exchange means for transferring a product container to a storage position and taking over a product container from a storage position, as well as a control system for controlling the carriages. Such systems, also referred to as "automatic storage and retrieval systems" (ASRS) are used in warehouses where products are stored in product containers and the product containers are in turn stored in the racks of the storage system. Such warehouses are used, for example, in automated order picking systems. Junctions are formed by crossings where two aligned parts of a longitudinal guide and two aligned parts of a transverse guide converge, by T-junctions where either two aligned parts of a longitudinal guide and a transverse guide or a longitudinal guide and two aligned parts of a transverse guide converge, or, for example, by right-angled connections between a longitudinal guide and a transverse guide at the location of corners of the storage system. In systems as described in the introduction, personnel regularly need to enter an aisle of the storage system. In practice this situation may for example occur in case of a malfunction or if maintenance work on the system is required. The height of each of the number of levels is frequently such that personnel (in an upright position) present in an aisle stands in the way of carriages that can move along the longitudinal guides or transverse guides of a number of superposed levels. It stands to reason that personnel safety is of paramount importance. For that reason the risk of a carriage moving on a level of the first number of levels where staff is or at least might be present must be excluded or at least minimised. The fact that the carriages have their own drive unit including their own energy supply unit, and in that sense are capable of moving autonomously, plays a part in that regard. Furthermore it is important to note that the present risk is in principle significantly greater if the guide system that is used has transverse guides in addition to longitudinal guides, which makes it possible for carriages to move from a longitudinal guide to an adjacent longitudinal guide via a transverse guide.

The object of the present invention is to provide a system as described in the introduction by means of which the risk of personnel present in an aisle being confronted with carriages moving in the same aisle, or at least within the part of that aisle where the personnel is present, within the height taken up by the personnel, can be excluded with a high degree of certainty. In order to achieve that object, the system according to the invention is characterised in that the control system comprises a central control unit and, for each carriage, a carriage control unit, which central control unit on the one hand and carriage control units on the other hand are designed to communicate with each other, with the central control unit being designed to determine a route for a carriage along a part of the guide system and to send a control signal for the route in question to the carriage control unit of the carriage in question, and wherein the carriage control unit in question is designed to control the carriage such that the carriage will travel along the route in question. The guide system is provided with unique identification signs at at least some of the junctions. Each carriage is provided with a reader for reading the identification sign and communicating said identification sign to the carriage control unit. The central control unit has a library at its disposal in which the relation between a unique identification sign and the associated junction is recorded. The central control unit is designed to mark certain junctions as "blocked" under certain circumstances, wherein the central control unit excludes "blocked" junctions upon determining the route, and to generate a list of unique identification signs associated with the "blocked" junctions and to send said list to the carriage control units, wherein each carriage control unit is designed to store said list in a database of the carriage control unit and to stop the carriage if the reader of the carriage communicates to the carriage control an identification sign which features on the list as stored in the database of the carriage control unit. The invention in fact identifies junctions at which there is a safety risk to the carriages, which, upon arriving at such a junction, can and will respond independently by stopping without any direct dependence on the central control system. This may for example be the case in situations in which a malfunction occurs in the central control unit, in a carriage control unit and/or in a lift. In the latter case, a carriage may for example be deposited at an incorrect layer. It is impossible to categorically exclude the occurrence of situations such as those described above. The invention involves the possibility that, in spite of the fact that the central control unit determines a route for a carriage, this does not automatically mean that eventually the carriage will actually follow said route. This will only take place under certain conditions, one condition according to the main aspect of the present invention in any case being the fact that the junctions that lie on the route are not marked as "blocked" by accordingly storing the list in the data bases of the carriage control unit, there is no dependence on communication between the central control unit and the carriage control unit when the carriage control unit in question passes a junction, which would be the case if the list were only stored in the central control unit.

It may be useful if the carriage control units are designed to send an acknowledgement signal to the central control unit after receipt of the list. If the central control unit does not receive such an acknowledgement signal, at least not within a particular interval after the sending of the list, the central control unit may be designed to send the list again, preferably directly, in order to ensure as well as possible that the carriage control units have stored the most recent list in their database. It is also possible that the carriage control units regularly communicate to the central control unit, for example every second, which version of the list is stored in the database of the carriage control unit. The central control unit will thus know which (version of the) list is at the disposal of the respective carriage control units. When a new (version of the) list becomes available to the central control unit, the central control unit will send this (version of the) list to the carriage control units. If necessary, the central control unit will repeat the sending of a list until the central control unit has received confirmation from the various carriage control units that they have the most recent version of the list at their disposal. If a carriage control unit should find that communication with the central control unit is not possible, for example due to a breakdown of the central control unit, the carriage control unit will stop the associated carriage, which may or may not take place after a certain period of time has elapsed.

The sending of the list to the carriage control units by the central control unit preferably takes place at regular intervals, for example ranging between 0.1 sec and 5 sec, and not only when the list changes. This reduces the risk of a list not or at least not correctly being stored in the respective databases by the carriage control units due to communication problems, based on the assumption that in practice communication problems are usually of short duration.

In order to exclude or at least reduce the risk of carriages colliding, the central control unit may be designed to mark parts of the guide system on the route as "reserved" for the carriage for which the route has been determined. This may be useful if several carriages have access to the same parts of the guide system. Marking parts of the guide system in this way obviates the need to use sensors on carriages, via which carriages could detect each other's presence. The use of such sensors in any case involves additional cost, with the additional risk of the sensors not functioning properly. The mark "reserved" for parts of the guide system can in turn be converted into a neutral or, in other words, available status again after the carriage in question has passed a "reserved" part. The parts of the guide system that can be marked as "reserved" may in any case concern the junctions, but also the longitudinal guides and transverse guides between the junctions, which guides themselves may also be divided into parts which can each individually be marked as "reserved". In practice the situation will be such that in certain cases parts of the guide system will only be marked as "reserved" for a relatively short period of time, for example for 10 seconds, but be marked as "blocked" for a relatively long period of time, for example for a few minutes to a few hours, or even longer. For that reason it is useful to send the list of "blocked" junctions to the carriage control units, but it will usually be less useful to have the central control unit send a list of "reserved" parts of the guide system to the carriage control units. Upon determination of the route by the central control unit, parts of the guide system that were marked as "blocked" or "reserved" at the start of the determination of the route are in principle excluded from forming part of a route determined by the central control unit.

In order to further increase safety, the central control unit may be designed to check between the determining of the route and the sending of the control signal whether at least a portion of the part of the guide system that lies on the route is in fact not marked as "reserved" for another carriage and/or as "blocked", and not to send the control signal until it has appeared from the check that no portion of the part of the guide system that lies on the route is marked as "blocked" and/or "reserved". The possibility that an error has occurred in the determination of the route by the central control unit, as a result of which "reserved" or "blocked" parts of the guide system nevertheless form part of the route as determined by the central control unit, is taken into account.

If it appears within the framework of the check described in the preceding paragraph that the route that has been determined is not available after all, the central control unit in the system according to the invention may be designed to determine an alternative route if it has been found during the check that a portion of the part of the guide system that lies on the route is marked as "reserved" and/or "blocked". The alternative route does not necessarily have the same end point as the route as initially determined, for that matter. The starting point of the alternative route will logically have the same starting point as the initially determined route, however. The present possibility certainly presents itself it if it has been found during the check that a part of the guide system on the route determined by the central control unit is marked as "blocked", since this situation generally lasts relatively long, but it may also be used advantageously if it has been found during the check in question that a part of the guide system on the route determined by the central control unit is marked as "reserved". In that case the alternative route may be formed by a shorter version of the initially determined route, viz. that part of the initially determined route to just the part of the initially determined route of which the associated part of the guide system is "blocked" or "reserved". After the carriage in question has traveled the shorter route, the control system can determine whether the remaining part of the initially determined route has indeed become available in the meantime.

In particular in the latter situation, the central control system may be designed to check again after a waiting period, for example a period between 1 sec and 15 sec, whether at least a portion of the part of the guide system that lies on the route is marked as "reserved" for another carriage and/or "blocked", if it has been determined during the check that a portion of the part of the guide system that lies on the route is marked as "reserved" and/or "blocked. If it turns out during the latter check that none of the parts of the guide system that lie on the route are marked as "reserved" for another carriage and/or "blocked", the central control unit can send the control signal for the initially determined route to the carriage in question yet. If the aforesaid condition is not met, the central control unit might be designed to carry out the check in question again after a waiting period or, for example, to determine an alternative route yet.

To increase safety, it may furthermore be advantageous if the central control unit is further designed to mark certain junctions as "direction-dependently blocked" under certain circumstances and to generate a first additional list of unique identification signs associated with the "direction-dependently blocked" junctions, in which first additional list each unique identification sign thereof is associated with at least one blocked direction, and to send said first additional list to the carriage control units, wherein each carriage control unit is designed to store said first additional list in the database of the carriage control unit and to stop the carriage if the reader of the carriage communicates to the carriage control unit an identification sign that features on the first additional list as stored in the database of the carriage control unit and the carriage control unit has received a control signal from the central control unit to the effect that the carriage should move from the junction in question in the direction indicated as a blocked direction with the identification sign in question. In the case of a mark "direction-dependently blocked" it is not necessary, therefore, to block a junction in its entirety, so that in principle carriages cannot reach the junction in question but the possibility of carriages moving in a particular direction, viz. in the blocked direction, from the junction in question is excluded. Such a blocked direction may occur, for example, if said direction leads to a junction that is marked as "blocked". Carriages are still allowed to travel from the respective "direction-dependently blocked" junction in directions other than the blocked direction.

It may furthermore be advantageous if the central control unit is further designed to mark certain junctions as "direction-dependently reduced speed" under certain circumstances and to generate a second additional list of unique identification signs associated with the "direction-dependently reduced speed" junctions, in which second additional list every unique identification sign thereof is associated with at least one direction in which a carriage is only allowed to move at a reduced speed and to send said second additional list to the carriage control units, wherein each carriage control unit is designed to store said second additional list in the database of the carriage control unit and to cause the carriage to move at a reduced speed from the junction in question if the reader of the carriage communicates to the carriage control unit an identification sign that features on the second additional list as stored in the database of the carriage control unit and the carriage control unit has received a control signal from the central control unit to the effect that the carriage should travel from the junction in question in the direction associated with the identification sign in question as the direction in which a carriage is only allowed to move at a reduced speed. From a junction marked as "direction-dependently reduced speed", a carriage is thus allowed to travel in all the directions that extend from the junction in question (providing that the junction in question is not coincidentally also marked as "direction-dependently blocked") with the proviso that the carriage is only allowed to move at a reduced speed in the direction indicated as a direction in which the carriage is only allowed to move at a reduced speed. Within the framework of the present possible embodiment, the term "reduced speed" is understood to mean a speed of at most half the maximum speed at which carriages travel along the guide system. A typical maximum speed is 2.0 m/sec, which means that the reduced speed is at most 1.0 m/sec, for example 0.5 m/sec. There may be various reasons why it is desirable that a carriage travels at a reduced speed. One reason may for example be the desire to be able to ensure with a high degree of certainty that identifications passed by the carriage are correctly read. Furthermore it may be considered to be desirable, in order to increase the sense of comfort of personnel present in an aisle, to prevent carriages from travelling at maximum speed or at least a high speed in the direction of said personnel, even if the route being followed by the carriage completely bypasses the aisle where the personnel is present.

An advantageous embodiment can be obtained if the unique identification signs are bar codes. Bar codes can be read by a reader in motion. Moreover, bar codes are quite inexpensive, there are practically insensitive to ambient factors and they do not require any energy.

The usability of the carriages of a system can be further increased if the system comprises at least one lift which connects to the guide system at different levels thereof for vertically transporting carriages. The carriages can thus be transported and transferred between different the second levels by means of the lift. A lift combined with the level at which the lift is positioned can also be regarded as a junction to which a mark such as "blocked", "direction-dependently blocked" and/or "direction-dependently reduced speed" can be allocated by the central control unit. Alternatively, the guide system may also be provided with sloping guide parts which interconnects superposed second levels of the guide system.

Although it is also possible within the framework of the present invention that the carriages comprise a number of superposed exchange means or that the exchange means are vertically movable, so that an exchange of product containers with storage positions at a number of superposed first levels can take place, using a single carriage, a highly effective use of the carriers can be realised in particular if the first number of levels equals the second number of levels.

The advantages of the present invention are manifest in particular, albeit not exclusively, if the system comprises at least one collecting station for collecting products from product containers in the storage system in collecting containers.

The present invention further relates to a method for using a system according to the invention as described in the foregoing. The method comprises the steps of a the central control unit marking specific junctions as "blocked" under certain circumstances, b the central control unit generating a list of unique identification signs associated with the "blocked" junctions, c the central control unit sending said list to the carriage control units, d each carriage control unit storing the list received from the central control unit in the database of the carriage control unit, e the central control unit determining a route for a carriage, which route extends along a part of the guide system, f the central control unit sending a control signal for the route in question to the carriage control unit of the carriage in question, g the carriage control unit controlling the carriage on the basis of the received control signal, such that the carriage will subsequently follow the route in question, h the reader of the carriage in question reading identification signs passed by the carriage while travelling along the route, i the reader communicating the identification signs being passed to the carriage control unit, j each carriage control unit causing the carriage in question to stop if the reader of the carriage has communicated to the carriage control unit during step i an identification sign that features on the list that has been stored in the database of the carriage control unit during step d.

Various aspects that play a part with such a method, including the advantages thereof, correspond to aspects that play a part in the system according to the invention as already explained in the foregoing.

The method according to the invention may further comprise the steps of k the central control unit marking parts of the guide system that lie on the route as "reserved", l the central control unit checking between steps e and f whether at least a portion of the part of the guide system that lies on the route is marked as "reserved" for another carriage and/or as "blocked", m the central control unit not sending the control signal until it has appeared from the check according to step l that no portion of the part of the guide system that lies on the route is marked as "blocked" and/or as "reserved".

When a system is used in which the central control unit marks specific junctions as "direction-dependently blocked" under certain circumstances, the method may further comprise the steps of n the central control unit marking specific junctions as "direction-dependently blocked" under certain circumstances,
o the central control unit generating a first additional list of unique identification signs associated with the "direction-dependently blocked" junctions, in which first additional list every unique identification sign thereof is associated with at least one blocked direction,
p the central control unit sending said first additional list to the carriage control units,
q each carriage control unit storing the first additional list received from the central control unit in the database of the carriage control unit,
r each carriage control unit causing the carriage in question to stop if the reader of the carriage communicates to the carriage control unit during step i an identification sign that features on the first additional list as stored in the database of the carriage control unit and the carriage control unit has received a control signal from the central control unit during step g to the effect that the carriage should travel from the junction in question in the direction indicated as a blocked direction with the identification sign in question.

If a system is used in which the central control unit marks specific junctions as "direction-dependently reduced speed" under certain circumstances, the method may further comprise the steps of
s the central control unit marking certain junctions as "direction-dependently reduced speed" under certain circumstances,
t the central control unit generating a second additional list of unique identification signs associated with the "direction-dependently reduced speed", in which second additional list every unique identification sign thereof is associated with at least one direction in which a carriage is only allowed to move at a reduced speed,
u the central control unit sending said second additional list to the carriage control units,
v each carriage control unit storing the second additional list received from the central control unit in the database of the carriage control unit,
w each carriage control unit causing the carriage in question to move at a reduced speed from the junction in question if the reader of the carriage communicates to the carriage control unit during step i an identification sign which features on the second additional list as stored in the database of the carriage control unit and the carriage control unit has received a control signal from the central control unit during step g to the effect that the carriage should move from the junction in question in the direction associated with the identification sign in question as a direction in which a carriage is only allowed to move at a reduced speed.

The order in which the various steps of methods according to the invention are presented with letter signs must not be interpreted as being limitative to the invention, unless a certain sequence of steps is prescribed, of course. Furthermore it obtains both with regard to the system according to the invention and with regard to the method according to the invention that the designation of the marks that can be allocated to parts of the guide system must not be interpreted literally, of course. The designation chosen is only intended to briefly express the concept that underlies the mark in question.

Figure 2:
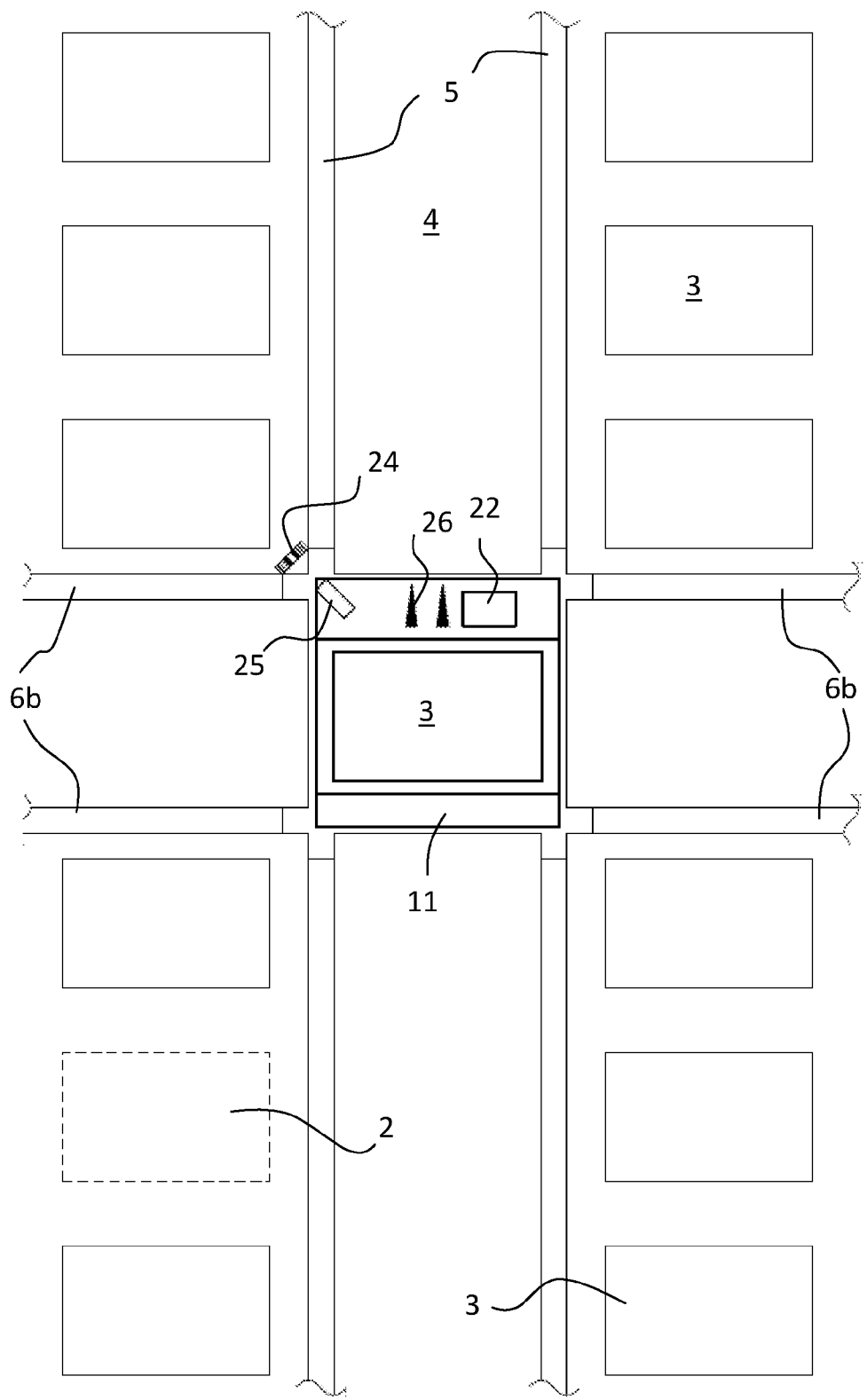
Figure 3:
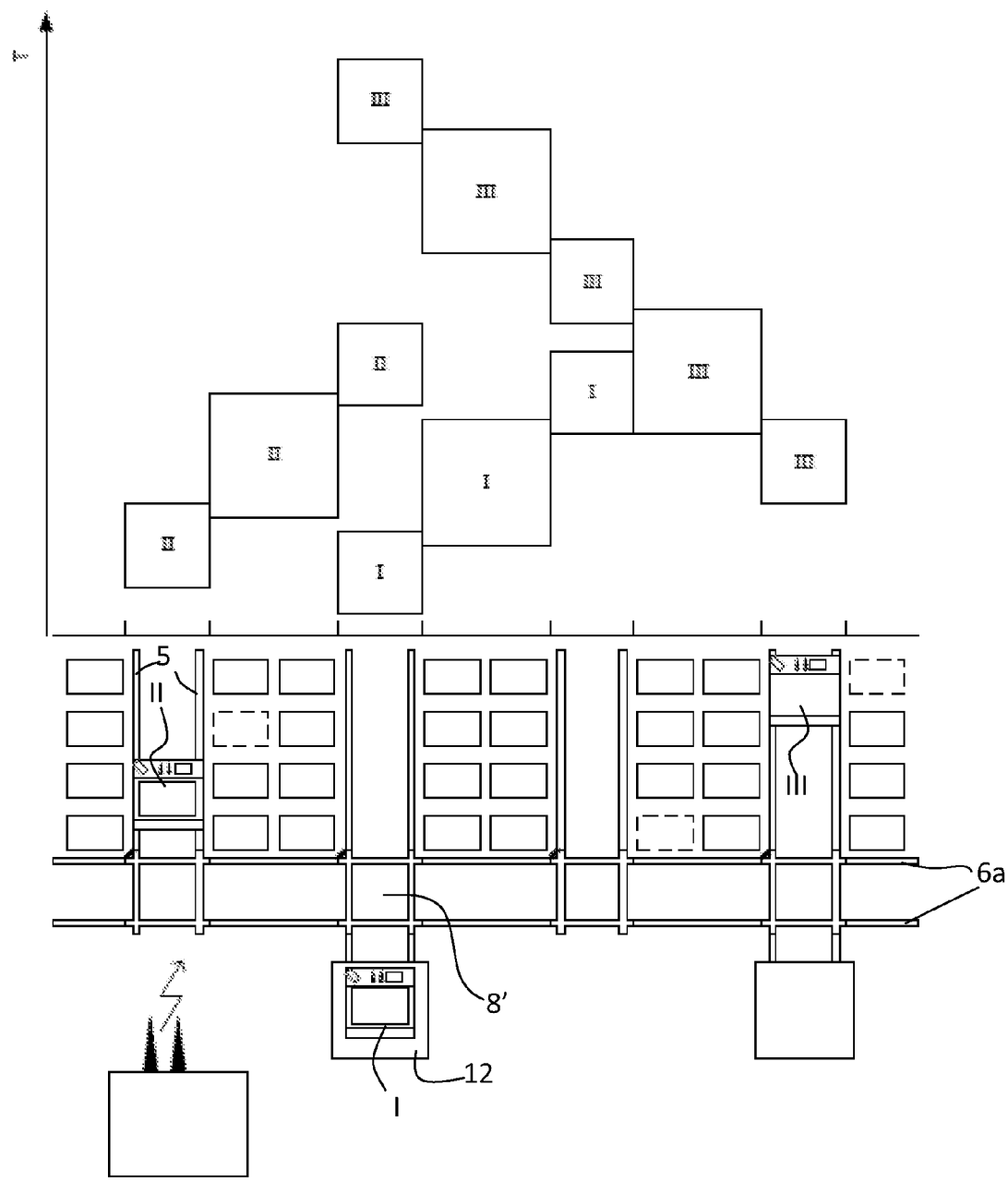

The invention will now be explained in more detail by means of a description of a preferred embodiment of the invention, in which reference is made to the following figures:

FIG. 1 is a schematic top plan view of a part of a system according to the invention;
FIG. 2 is a schematic top plan view a part of FIG. 1 in the vicinity of a crossing thereof;
FIG. 3 is a schematic diagram showing the use of the system according to FIGS. 1 and 2.

The storage system according to FIG. 1 comprises a number of racks 1, which extend parallel to each other. Each rack 1 is provided with a number of superposed layers, for example ten layers, which layers comprise storage positions 2. The storage positions 2 are designed to store product bins 3. Empty storage positions 2 are illustrated in broken lines in the figures. Each product bin 3 is filled with one product or a number of (identical) products, or it is empty and thus suitable for being filled with one product or a number of (identical) products. The racks are provided in pairs, with an aisle 4 extending between the racks 1 of each pair.

The system further comprises a guide system comprising longitudinal guides 5 and transverse guides 6. The longitudinal guides 5 extend in the aisles 4, whilst the transverse guides 6, on the contrary, extend transversely to the aisles 4, i.e. transversely to the longitudinal guides and to the racks. In the system according to FIG. 1, three transverse guides 6 are provided for each layer of the system, with the transverse guides 6a and 6c being provided at opposite ends of the racks 1 and the transverse guide 6b intersecting the racks 1 halfway their lengths. The racks 1 are not provided with storage positions 2 at the location of said intersections.

The longitudinal guides 5 and the transverse guides 6 connect at junctions. More specifically, the longitudinal guides 5 connect to the transverse guide 6a at the location of T-junctions 7 and crossings 8, which T-junctions 7 and crossings 8 are provided alternately. The longitudinal guides 5 connect to the transverse guide 6b at the location of the crossings 9, and the longitudinal guides 5 and the transverse guide 6c connect at the location of the T-junction 10. The longitudinal guides 5 and the transverse guides 6 thus form a regular rectangular grid for each layer, with the storage positions 2 for the product bins 3 provided in the holes of said grid.

Carriages 11 can move along the longitudinal guides 5 and the transverse guides 6. The carriages 11 are to that end fitted with two sets of running wheels, which are vertically adjustable relative to each other and which are oriented transversely to each other. Via a first set of running wheels, each carriage 11 can move along the longitudinal guides, whilst the carriages 11 can move along the transverse guides 6 after switching over from one set of running wheels to the other set of running wheels, which in practice takes place at the location of one of the junctions 7, 8, 9, 10. It will be understood that if a carriage 11 changes direction at the location of a junction 7, 8, 9, 10, with the orientation of the carriage 11 remaining unchanged, therefore, the carriage 11 will briefly be stationary at the junction 7, 8, 9, 10.

In order to be able to move, each carriage 11 has its own drive unit and its own energy supply unit, for example consisting of an electric motor and an electric battery. The carriages 11 are designed to move product bins 3 within the system and to that end comprise exchange means by means of which a product bin 3 carried by the carriage can be transferred to a storage position 2, or by means of which a product bin 3 can be taken over from a storage position 2. The exchange means may in practice be embodied as extending support arms, for example, which are slightly adjustable for height relative to a storage position 2. Carriages 11 as described so far are known per se; they are for example described in publication WO 93/12998 A1, so that a more detailed description of the carriages 11 is not necessary, in any case as far as the above-indicated aspects thereof are concerned.

It will be understood that, in part because of the schematic nature of FIG. 1, FIG. 1 only shows a part of a system. In practice the system will usually comprise more racks and the guide system will be extended accordingly. Furthermore, the racks may be longer and be intersected by more than one transverse guide.

Lifts 12 are provided at the location of the crossings 8, by means of which lifts carriages 11, which may or may not be loaded with a product bin 3, can be transported in vertical direction between the various layers of the system. Using lifts 12, product bins 3 can also be supplied to a collecting station, for example, where order picking takes place and products are collected from product bins 3 into a collecting bin.

The system further comprises a control system. The control system has a central control unit 21 and a carriage control unit 22 for each carriage 11. Both the central control unit 21 and the carriage control units 22 are provided with antennas 23, 26, via which the central control unit 21 on the one hand and the carriage control units 22 on the other hand can exchange information. Such information may for example be made up of control signals from the central control unit 21 to one or a number of carriage control units 22, confirmation signals from a carriage control unit 21 to the central control unit 21, for example communicating the fact that a control signal has been duly received, or a position signal by means of which a carriage control unit 22 communicates the location of the associated carriages 11 in the system to the central control unit 21.

In use of the system, the central control units 21 receives commands, for example to collect products in product bins 3 stored in one of the storage positions 2 in accordance with a collecting order and to that end transport the product bins to a collecting station. Based on such instructions, the central control unit is designed to determine routes for the carriages 11. Said route are communicated to the carriage control unit 22 in question by means of a control signal, which carriage control unit optionally returns a confirmation signal to the central control units 21. The routes concern a series of junctions to which a carriage is to move at a certain speed, wherein, as a storage position 2 comes near, the route also comprises information about the distance a carriage must travel from an upstream junction 7, 8, 9 or 10. The carriage control units 22 are in turn designed to control the associated carriages 11 on the basis of the control signal, such that the carriage 11 will move according to the route in question.

In the present invention, the guide system is provided with a bar code 24 at at least some of the junctions 7, 8, 9, 10, at all the junctions 7, 8, 9, 10 in the present example, which bar codes each constitute a unique identification sign. Said bar code is provided at the same position at every junction 7, 8, 9, 10, viz. in the left-hand upper corner of the junction 7, 8, 9, 10 in question in FIG. 1. Each carriage 11 is provided with a reader 25, by means of which the bar codes 24 can be read at the junctions 7, 8, 9, 10. Both the reader 25 and the bar code 24 are oriented at an angle of 45° relative to the longitudinal guides 5 and the transverse guides 6. The reader 25 is thus readily capable of reading a bar code 24 independently of the direction in which the carriage 11 in question approaches the respective junction 7, 8, 9, 10. It is also conceivable, however, that the bar codes 24 are oriented parallel to the longitudinal guides 5, for example. Bar codes 24 may also be present in the aisles 4, for example in order to enable the system to communicate a nearby code 24 to the central control unit 21 quickly after a carriage 11 has dropped out and the connection between the carriage control unit 22 and the central control unit 21 has been broken, so that the location of the carriage 11 can be determined.

After the bar code 24 has been read by a reader 25, the associated carriage control unit 21 will verify whether the bar code 24 that has been read is also a bar code 24 that was to be expected according to the route for which the carriage control unit 21 has received a control signal from the central control unit 21. In that should not be the case, the carriage control unit 22 will stop the carriage 11 and deliver a signal to the central control unit 21 whilst at the same time communicating the bar code that has been read.

For different reasons it may be desirable for personnel to enter an aisle 4, for example because of a malfunction that must be manually remedied. In FIG. 1 such a person is indicated by numeral 31. Of course there is a risk of a carriage 11 colliding with a person 31 while following a route. In order to reduce this risk, the central control unit 21 is designed to mark certain junctions 7, 8, 9, 10 as "blocked". By blocking certain junctions 7, 8, 9, 10 (or direction-dependently blocking junctions 7, 8, 9, 10 as will be discussed yet hereinafter), also parts of the longitudinal guides 5 or the transverse guides 6 that are located between the junctions 7, 8, 9, 10 in question can in fact be blocked. Upon determining routes for carriages 11, the central control unit will interpret the "blocked" junctions 7, 8, 9, 10 as being unavailable and ensure that the "blocked" junctions 7, 8, 9, 10 will not form part of the route. Precisely because of the fact that the carriages 11 are provided with their own drive unit with their own energy supply unit, this provides insufficient security for the personnel 31, however. It is conceivable, for example, that the central control unit 21, a carriage control unit 21 or a lift 12 will not function properly. This is why further measures have been taken in accordance with the invention to increase the safety of the personnel 31. Concretely, this concerns the generation by the central control unit 21 of a list of bar codes 24 that are associated with the "blocked" junctions 7, 8, 9, 10. This list is communicated to the carriage control units 22 by the central control units 21. The carriage control units 22 subsequently store this list in a database of the carriage control unit 21. As soon as a bar code 24 has present on the list stored in the database of the carriage control unit 22 is communicated to the carriage control unit by the reader 25 of the carriage, the carriage control unit 22 will interfere by stopping the carriage 11. This leads to greater safety for the personnel 31.

The central control unit 21 is further designed to mark as "reserved" parts of the guide system that lie on the route as communicated to a carriage control unit 22 by means of a control signal. Such parts of the guide system may in any case be formed by the junctions 7, 8, 9, 10. The status "reserved" can subsequently be cancelled after the central control unit 21 has received a signal from the carriage control unit 22 that the part in question has been passed. Such a signal may for example be based on the reading by the reader 25 of a bar code 24 that is passed by the carriage 11 in question. Upon determining a route, the central control unit 21 will not only leave the "blocked" junctions out of consideration, but also the "reserved" junctions 7, 8, 9, 10 or, in general, the "reserved" parts of the guide system. This adds to the safety of the system as well, because the risk of carriages 11 colliding can thus at least significantly be reduced. The central control unit 21 will not actually send a control signal to a carriage control unit 22 until it has appeared from a check directly preceding the possible sending of the control signal that no portion of the part of the guide system that lies on the route has been marked as "blocked" and/or "reserved".

If it should appear from said check that a portion of the part of the guide system that lies on the route has actually been marked as "reserved" and/or "blocked", the central control unit 21 will not send a control signal for that route to a carriage control unit 22 but instead determine an alternative route for which the above check would be carried out anew. It is also conceivable that instead of determining an alternative route, or after it has been attempted in vain to determine an alternative route, the central control unit will carry out the check in question again after a certain waiting period, for example after 10 seconds.

In the example of FIG. 1, it is conceivable that the personnel 31 involved in the malfunction in question only need to make their way into that part of the aisle 4 that extends between the crossing 9' and the T-junction 10'. Thus, no carriages 21 are allowed to travel in said part of the aisle 4, at least for the levels at which the personnel 31 may be present. The personnel 31 will make their way into said part of the aisle 4 via the T-junction 10'. This means that no carriages 21 may be present at or travel past the T-junction 10', either.

In order to grant the personnel 31 access to an aisle (or at least part of the height thereof), grid walkways, spaced a regular vertical distance, for example 2 meters, apart may be provided in the aisles 4, just below a longitudinal guide 5. Between the grid walkways, five layers of the system may be disposed, for example. The possible presence of personnel 31 at the T-junction 10' means that the T-junction 10' is off-limits to carriages 11. Consequently, the central control unit 21 will mark said T-junction 10' as "blocked". This goes for all the layers at which personnel may be present. Hereinbefore and hereinafter the invention has been/will be explained primarily by means of a description of one layer.

A slightly different situation applies as regards the crossing 9'. In principle, the personnel 31 will not be physically present at said crossing 9' during the work. Consequently it is not necessary to mark said crossing 9' as "blocked". Instead, the central control unit 21 will mark the crossing 9' as "direction-dependently blocked", and in addition the central control unit 21 will determine for that crossing 9' that the blocked status of the crossing 9' only applies as regards the direction that extends from the crossing 9' to the T-junction 10'. Carriages 11, upon arriving at the crossing 9', are not allowed to move in the direction of the T-junction 10', therefore, whereas they are allowed to move in the other three directions. The central control unit 21 will generate a first additional list of bar codes 24 associated with the junctions 7, 8, 9, 10 that are marked as "direction-dependently blocked", in which first additional list each respective bar code 24 is associated with at least one blocked direction. In the present simplified example, junctions 9',10" and 10'" are on said list. The first additional list in question is sent to each carriage control unit 21 by the central control unit 21, which carriage control units 21 will store said first additional list in the database of the carriage control unit 22. As soon as a reader 25 reads a bar code that features on the first additional list, the carriage control unit 21 will not control the carriage 11 to move from the junction 7, 8, 9, 10 in question in one of the possible directions until the carriage control unit 21 has verified that the direction in question is not the direction that is indicated as a forbidden direction for the bar code 24 in question, or, in other words, for the junction 7, 8, 9, 10 in question.

For various reasons it may furthermore be desirable that carriages 11 move at a reduced speed in certain parts of the guide system. Where carriages 11 normally travel over the guide system at a speed of 2.0 m/sec, for example, the reduced speed will be 0.5 m/sec, for example. Such a situation occurs, for example, for carriages 11 that move from the crossing 8' to the crossing 9'. In the first place it would be highly uncomfortable to personnel 31 if carriages 11 travelling from the crossing 8' in the direction of the crossing 9' would do so at full speed, since there will always be uncertainty among the personnel 31 as regards the possibility of the carriage 11 in question keeping straight ahead. If this should in fact unintentionally happen, the personnel 31 would not have (sufficient) opportunity to take themselves to a place of safety. Moreover, the reader 25 of the carriage 11 in question may not be able to read the bar code 24 at the crossing 9' if the carriage 11 should pass the crossing 9' straight ahead at full speed, precisely because of said high speed, which is exactly what is needed in order to be able to determine whether the crossing 9' is specially marked. For that reason the central control unit 21 will mark the crossing 8' as "direction-dependently reduced speed". The central control unit 21 will further generate a second additional list of bar codes 24 associated with the "direction-dependently reduced speed" junctions. In said second additional list, the bar codes 24 listed therein are associated with directions in which a carriage 11 is only allowed to travel at reduced speed. In the present example, the directions in question include inter alia the direction from the crossing 8' to the crossing 9'. The reduced speed makes it possible to ensure that the reader 25 of the carriage 11 in question will be able to read the bar code of the "direction-dependently blocked" crossing 9' the moment the carriage 11 arrives at the crossing 9'. The status "direction-dependently reduced speed" also applies to the lift 12 (opposite the crossing 8') and the T-junction 10" (in the direction of the T-junction 10'").

In use of a system as described in the foregoing, most activity will take place at the transverse guides 6a that form the connection between the lifts 12 and the rest of the storage system. FIG. 3 shows the surroundings of said transverse guides 6a. In order to enable more carriages 11 to travel over said transverse guides 6a, it will be advantageous to have the determining of routes on this part of the system take place while taking into account a time component. This is shown in FIG. 3. In the lower part of FIG. 3, three carriages 11 are indicated by Roman numerals I, II and III. Carriages I, II and III want to follow a route over the transverse guides 6a, more specifically along the crossing 8' thereof, simultaneously: carriage I wants to move to the right from the lift 12 via the crossing 8', carriage II wants to move from the most left-hand longitudinal guides 5 to the list 12 and carriage III wants to move from the most right-hand longitudinal guides 5 to the second longitudinal guide from the left. In the case of a conventional system control, only one carriage 11 at a time is admitted to the transverse guides 6a so as to prevent carriages from coming into collision with each other. The three required movements must take place in succession in that case. Carriage III must thus wait for carriage II, which in turn must wait for carriage I.

It is advantageous, however, to allocate the junctions and the parts between the junctions individually to the route of a carriage 11. In this way several carriages 11 wanting to travel over different parts of the cross guides 6a could be admitted simultaneously, thereby increasing the throughput of the system. In the case described herein this will be of no avail, because all carriages want to follow a route via the crossing 8'. Consequently, the route must be planned to be followed in succession and the throughput of the system will not be increased.

It is additionally advantageous, therefore, to plot the routes the carriages the carriages want to follow also in time. Said planning is shown in the diagram in the upper part of FIG. 3. The time T is plotted on the vertical axis. The blocks in the diagram indicate when the junctions and parts between the junctions are allocated to particular carriages. The numbers and the blocks correspond to the carriage at a junction or to a part between junctions. Upon determining said blocks, the allowed speed of a carriage and the time said carriage needs to change direction at the junction is taken into account. The positions of the carriages I, II and III at a specific point in time t can be read from the diagram by following a horizontal line from the location of point in time t on the vertical axis T. Each carriage is present in the block with the corresponding number at said point in time t, which block is intersected by the horizontal line. As the diagram clearly shows, this manner of controlling enables all the carriages to continue their route at the same time, so that the throughput of the system can be optimally utilised.

The invention is not limited to the example as described in the foregoing for a simplified situation. For a correct assessment of the scope of the present invention, reference must be had to the appended claims.

The invention claimed is:

1. A system for storing product containers, comprising:
a number of racks extending parallel to each other, wherein each rack is provided with side-by-side storage positions for product containers on a first number of superposed levels;
a guide system comprising horizontal longitudinal guides extending in aisles between adjacent racks and parallel to the racks on a second number of levels;
horizontal transverse guides extending transversely to the longitudinal guides on the second number of levels;
junctions at positions where at least one longitudinal guide and at least one transverse guide connect,
the system further comprising:
a plurality of carriages capable of travelling along the guide system, each carriage comprising:
an exchange means for transferring a product container to a storage position and taking over a product container from a storage position,
a control system for controlling the carriages, wherein the control system comprises a central control unit, and;
a carriage control unit, which the central control unit and carriage control unit are designed to communicate with each other, the central control unit configured to
determine a route for a carriage along a part of the guide system and
send a control signal for the determined route to the carriage control unit of the carriage, and
wherein the carriage control unit is designed to control the carriage based on a control signal received from the central control unit, and the carriage travels along the determined route
the guide system is provided with unique identification signs at the locations of at least some of the junctions, and
each carriage is further provided with a reader that is designed to read the identification sign when the carriage passes the identification sign, and the reader communicates said identification sign to the carriage control unit, and the central control unit has a library at its disposal in which the relation between a unique identification sign and the associated junction is recorded,
wherein the central control unit is further designed to mark certain junctions as "blocked" under certain circumstances,
the central control unit excludes "blocked" junctions upon determining the route and generates a list of unique identification signs associated with the "blocked" junctions and further sends the list to the carriage control units;
wherein each carriage control unit stores said list in a database of the carriage control unit and stops the carriage if the reader of the carriage communicates an identification sign of a junction, which identification sign is included on the list in the database to the carriage control unit.

2. A system according to claim 1, wherein the central control unit marks parts of the guide system of the determined route for the carriage as "reserved".

3. A system according to claim 1, wherein the central control unit is configured to:
check whether at least a portion of the part of the guide system on the route is not marked as "reserved" and/or "blocked" for another carriage, and
the control unit does not send the control signal until it has been determined that no portion of part of the guide system on route is marked as "blocked" and/or "reserved" between determining the route and sending the control signal.

4. A system according to claim 3, wherein the central control unit determines an alternative route if it is determined that no portion of the part of the guide system on the route is marked as "reserved" and/or "blocked".

5. A system according to claim 3, wherein the central control system is designed to check again after a waiting period whether at least a portion of the part of the guide system that lies on the route is marked as "reserved" for another carriage and/or "blocked" if it has been determined during the check that a portion of the part of the guide system that lies on the route is marked as "reserved" and/or "blocked.

6. A system according to claim 1, wherein the central control unit is further configured to
mark certain junctions as "direction-dependently blocked" under certain circumstances and to generate a first additional list of unique identification signs associated with the "direction-dependently blocked" junctions, and the first additional list is stored in the database of the carriage control unit;
wherein the first additional list includes each unique identification sign that is associated with at least one blocked direction, and;
the control unit sends said first additional list to the carriage control units,
each carriage control unit is designed to store said first additional list in the database of the carriage control unit, and;
stops the carriage if the reader of the carriage communicates to the carriage control unit an identification sign that is included in the first additional list, and;
the carriage control unit has received a control signal from the central control unit that the carriage should move from the junction in the direction indicated as a "blocked" direction with the identification sign.

7. A system according to claim 1, wherein the central control unit is further configured to:

mark certain junctions as "direction-dependently reduced speed" under certain circumstances and;

to generate a second additional list of unique identification signs associated with the "direction-dependently reduced speed" junctions, wherein the second additional list includes every unique identification sign that is associated with at least one direction wherein a carriage is only allowed to move at a reduced speed and, the central control units sends said second additional list to the carriage control units, wherein each carriage control unit stores said second additional list in a database of the carriage control unit, and causes the carriage to move at a reduced speed from the junction if:

the reader of the carriage communicates an identification sign that is included on the second additional list to the carriage control; and the carriage control unit has received a control signal from the central control unit that the carriage should travel from the junction in the direction associated with the identification sign as the direction for the carriage in which the carriage is only allowed to move at a reduced speed.

8. A system according to claim 1, wherein the unique identification signs are bar codes.

9. A system according to claim 1, wherein the system comprises at least one lift that connects the guide system at different levels thereof for vertically transporting carriages.

10. A system according to claim 1, wherein the first number of levels equals the second number of levels.

11. A system according to claim 1, further comprising at least one collecting station for collecting products from product containers in the storage system in collecting containers.

12. A method for use in a system according to claim 1, comprising the steps of:
   a marking specific junctions as "blocked" by the central control unit under certain circumstances,
   b generating a list of unique identification signs associated with the "blocked" junctions,
   c sending said list by the central control unit to the carriage control units,
   d each carriage control unit storing the list received from the central control unit in the database of the carriage control unit,
   e determining a route for a carriage by the central control unit, which the route extends along a part of the guide system,
   f sending a control signal to the carriage control unit of the carriage of the route by the central control unit,
   g controlling the carriage on the basis of the received control signal, such that the carriage will subsequently follow the route by the central control unit,
   h reading identification signs passed by the carriage while travelling along the route by the reader of the carriage,
   i the reader communicating the identification signs being passed to the carriage control unit,
   j causing the carriage to stop if the reader of the carriage has communicated to the carriage control unit during step i an identification sign that is included on the list that has been stored in the database of the carriage control unit during step d.

13. A method according to claim 12, further comprising the steps of:

k marking parts of the guide system that lie on the route as "reserved", l checking the steps e and f to determine whether at least a portion of the part of the guide system on the route is marked as "reserved" and/or as "blocked" for another carriage by the central control unit, and m not sending the control signal until it is determined according to step l that no portion of the part of the guide system on the route is marked as "blocked" and/or as "reserved".

14. A method according to claim 12, using a system according to claim 6, comprising the steps of:

marking specific junctions as "direction-dependently blocked" under certain circumstances by the central control unit; wherein the central control unit is further configured to:

generate a first additional list of unique identification signs associated with the "direction-dependently blocked" junctions, wherein the first additional list includes every unique identification sign that is associated with at least one blocked direction, send said first additional list to the carriage control units, wherein each carriage control unit storing the first additional list received from the central control unit in the database of the carriage control unit, each carriage control unit causing the carriage in question to stop if:

the reader of the carriage communicates to the carriage control unit during step i an identification sign that is included features on the first additional list stored in the database, and, the carriage control unit has received a control signal from the central control unit during step g to the effect that the carriage should travel from the junction in question in the direction indicated as a "blocked" direction with the identification sign.

15. A method according to claim 12, using a system according to claim 7, comprising the steps of:

marking certain junctions as "direction-dependently reduced speed" under certain circumstances by the central control unit, generating a second additional list of unique identification signs associated with the "direction-dependently reduced speed" the central control unit, the second additional list includes every unique identification sign that is associated with at least one direction wherein a carriage is only allowed to move at a reduced speed, wherein the central control unit sends said second additional list to the at least one carriage control unit, and each carriage control unit stores the second additional list received from the central control unit in the database of the carriage control unit, each carriage control unit causing the carriage to move at a reduced speed from the junction if:

the reader of the carriage communicates to the carriage control unit during step i an identification sign that is included on the second additional list as stored in the database, and, the carriage control unit receives a control signal from the central control unit during step g that the carriage should move from the junction in the direction associated with the identification sign wherein a carriage is only allowed to move at a reduced speed.

* * * * *